United States Patent [19]
Novakovich et al.

[11] Patent Number: 5,293,632
[45] Date of Patent: Mar. 8, 1994

[54] METHOD AND APPARATUS FOR LOAD SHEDDING USING A TRAINLINE MONITOR SYSTEM

[75] Inventors: Michael R. Novakovich, Pittsburgh; Richard D. Roberts, Elizabeth, both of Pa.

[73] Assignee: AEG Transportation Systems, Inc., Pittsburgh, Pa.

[21] Appl. No.: 853,540

[22] Filed: Mar. 18, 1992

[51] Int. Cl.$^5$ .............................................. G06F 1/32
[52] U.S. Cl. ............................. 395/750; 364/DIG. 1; 364/221.7; 364/273.1; 364/424.03
[58] Field of Search ................... 395/750; 364/424.01, 364/424.03

[56] References Cited

U.S. PATENT DOCUMENTS

| | | | |
|---|---|---|---|
| 4,266,485 | 5/1981 | Bruner et al. | 105/61 |
| 4,652,057 | 3/1987 | Engle et al. | 303/3 |
| 5,017,799 | 5/1991 | Fishman | 307/34 |
| 5,053,964 | 10/1991 | Mister et al. | 364/424.1 |
| 5,142,277 | 8/1992 | Yarberry et al. | 340/825.57 |
| 5,191,520 | 3/1993 | Eckersley | 363/72 |

FOREIGN PATENT DOCUMENTS

WO90/09050  8/1990  PCT Int'l Appl.
WO91/01231  2/1991  PCT Int'l Appl.
WO91/11791  8/1991  PCT Int'l Appl.

OTHER PUBLICATIONS

ISO 4335, Third Edition, "Information Processing Systems Data Communication-High-Level Data Link Control Elements of Procedures," International Organization for Standardization, Jan. 8, 1987.

Draft DIN 43322 German Standard specification, Parts 1, 2, 4 and 5 dated Jun. 1988 and Part 3 dated Jul. 1988, Parts 1-5 in English and Part 3 in German also.

Primary Examiner—Debra A. Chun
Attorney, Agent, or Firm—Spencer, Frank & Schneider

[57] ABSTRACT

A method for controlling power consumed by a plurality of subsystems on a multi-car train having a plurality of power supplies connected in parallel for supplying power to the subsystems. The train has a train wide communication network which includes a vehicle bus in each car of the train communicating with the power supplies and subsystems on the car, a train bus extending through the entire train, and communication nodes in each car interconnecting the train bus with each one of the vehicle buses. One of the communication nodes in one of the cars constitutes a master node and the other communication nodes in the other cars constitutes slave nodes, each slave node communicating status information about power supplies and subsystems on its vehicle bus to the master node and communicating control information to the power supplies and subsystems on its vehicle bus. The method includes using the communications network to periodically determine the number of functional power supplies connected in parallel, determining from the number of functional power supplies available for supplying power at any given time a variable corresponding to the total power available for power consuming subsystems on the train and selectively reducing subsystems on the train by way of the communications network in accordance with the variable determined by the determining step.

5 Claims, 5 Drawing Sheets

METHOD AND APPARATUS FOR LOAD SHEDDING USING A TRAINLINE MONITOR SYSTEM

CROSS REFERENCE TO RELATED APPLICATIONS

This application is related to the following copending applications assigned to the same assignee as the present application which are hereby incorporate by reference:

U.S. Pat. application Ser. No. 07/686,927, entitled "PROPULSION CONTROL SYSTEM CENTRAL PROCESSING UNIT BOARD" filed Apr. 18th, 1991, by William F. Molyneaux;

Ser. No. 08/029,348, which is a continuation of Ser. No. 07/853,250, by Michael R. Novakovich and Joseph S. Majewski, entitled "A METHOD AND APPARATUS FOR MONITORING AND SWITCHING OVER TO A BACK-UP BUS IN A REDUNDANT TRAINLINE MONITOR SYSTEM" filed Mar. 18, 1992;

Ser. No. 07/853,420, by Joseph S. Majewski, entitled "COLLISION HANDLING SYSTEM" filed Mar. 18, 1992;

Ser. No. 07/853,796 by Michael R. Novakovich and Joseph S. Majewski, entitled "A METHOD AND APPARATUS FOR CHRISTENING A TRAINLINE MONITOR SYSTEM" filed Mar. 18, 1992;

Ser. No. 07/853,960, by Michael R. Novakovich and Joseph S. Majewski, entitled "MULTI-MASTER RESOLUTION OF A SERIAL BUS" filed Mar. 18, 1992;

Ser. No. 07/853,251 by Michael R. Novakovich and Richard D. Roberts, entitled "A METHOD AND APPARATUS FOR PLACING A TRAINLINE MONITOR SYSTEM IN A LAYUP MODE" filed Mar. 18, 1992;

Ser. No. 07/853,186, by Henry J. Wesling, Michael R. Novakovich and Richard D. Roberts, entitled "REAL-TIME REMOTE SIGNAL MONITORING" filed Mar. 18, 1992;

Ser. No. 07/853,205, by Michael R. Novakovich, RIchard D. Roberts and Henry J. Wesling, entitled "TRAIN DIAGNOSTIC AND STATUS DISPLAY SYSTEM" filed Mar. 18, 1992;

Ser. No. 07/853,402, by William F. Molyneaux, entitled "COMMUNICATIONS CONTROLLER CENTRAL PROCESSING UNIT BOARD" filed Mar. 18, 1992;

Ser. No. 07/853,204, by Henry J. Wesling, Michael R. Novakovich and Richard D. Roberts, entitled "DISTRIBUTED PTU INTERFACE" filed Mar. 18, 1992; and Ser. No. 07/853,659, by Michael R. Novakovich and Joseph S. Majewski, entitled "A METHOD AND APPARATUS FOR TRANSMITTING PROPULSION AND BRAKING COMMANDS FOR A TRAIN" filed Mar. 18, 1992.

BACKGROUND OF THE INVENTION

1. Field of the Invention

This invention relates generally to an apparatus and a method for controlling power consumed by a passenger train, in particular to an apparatus and method of load shedding using a trainwide communication system whereby at least one train car in the passenger train receives power from a high voltage source and has an intermediate voltage power supply which outputs intermediate voltage to other cars on the train.

2. Background of the Related Art

Trains are typically powered from a high voltage (e.g., 600 V) DC power supplied by a high voltage line on a third rail. It is common that some cars on such trains carry intermediate voltage power supplies which convert the high level DC voltage to an intermediate level (e.g., 350 V) from which heating, air conditioning and braking units are driven. A single line running the length of the train can be connected to these power supplies and consequently, every car does not have to carry such a power supply.

Each car carrying such an intermediate voltage power supply is coupled to the high voltage 600 V line. However, since the high voltage power is supplied by separate high voltage sources, there are often gaps along the third rail at which no high voltage power is available. Consequently, if the train happens to stop so that a car carrying one of the intermediate voltage power supplies is at one of these gaps, or if one or more of the intermediate voltage power supplies breaks down, a fewer number of intermediate voltage power supplies must supply power to the same number of heating, air conditioning and braking units. This can result in overloading the intermediate voltage power supplies and/or damaging the heating, air conditioning and braking units (the latter possibly resulting in brake failure).

In addition, other equipment on the cars such as lighting circuitry or door control circuitry require even lower (e.g., 37 V) operating voltages. Such operating voltages can typically be obtained by using a converter which can be placed on each car of the train connected to the high voltage (600 V) line and a storage battery. The converter unit charges the storage battery which is coupled to a low voltage (37 V) line that also runs along the entire train. Again, if the train stops at gaps along the high voltage line, the converter cannot receive the high voltage it needs to charge the battery. Consequently, fewer converters and batteries must drive the same number of lighting and door units.

With the advent of trainwide communication systems, a solution to the above problems has become possible. For example, a train communication system is being developed by the assignee of the present application which, based on the proposed European specification DIN 43322 for "Serial Interfaces to Programmable Electronic Equipment for Rail Vehicles," incorporated herein by reference, enables a master node located typically in a head car of a train to communicate via a serial bus to slave nodes on middle cars of the train and on a tail car of the train. See also, "International Standard-Information processing systems-Data communication-High-level data link control elements of procedures, ISO 4335", Third edition, Global Engineering Documents, Irvine, CA, 1987, the subject matter of which is also incorporated herein by reference.

SUMMARY OF THE INVENTION

An object of the invention is therefore to provide a method and apparatus to control power consumed by a passenger train by shutting off certain equipment whenever power supplies on the train are being overloaded.

A further object of the invention is to extend the life of equipment consuming power on the train.

A feature of the invention is that it intelligently energizes or de-energizes equipment on a train over a train-wide communication network.

These and other objects advantages and features are accomplished in accordance with the provision of a method for controlling power consumed by a plurality of subsystems on a multi-car train having a plurality of power supplies connected in parallel for supplying power to the subsystems and a train wide communication network including a vehicle bus in each car of the train communicating with the power supplies and subsystems on the car, a train bus extending through the entire train, and communication nodes in each car interconnecting the train bus with each one of the vehicle buses, with one of the communication nodes in one of the cars constituting a master node and the other communication nodes in the other cars constituting slave nodes, each slave node communicating status information about power supplies and subsystems on its vehicle bus to the master node and communicating control information to the power supplies and subsystems on its vehicle bus, the method including: using the communications network to periodically determine the number of functional power supplies connected in parallel; determining from the number of functional power supplies available for supplying power at any given time a variable corresponding to the total power available for power consuming subsystems on the train; and selectively de-energizing subsystems on the train by way of the communications network in accordance with the variable determined by the determining step.

According to one aspect of the invention, the de-energizing step includes making a selection at the master node of the subsystems on the train to be de-energized in dependence on the variable of the determining step and sending messages from the master node to the slave nodes for de-energizing the selected subsystems in respective ones of the cars.

According to another aspect of the invention, the de-energizing step includes sending the variable determined by the determining step to each one of the slave nodes and having each one of the slave nodes select subsystems on a respective one of the cars to be de-energized in dependence on the variable.

Another aspect of the invention includes displaying the variable determined by the determining step on an operator's display console, manually selecting the subsystems on respective ones of the cars to be de-energized in dependence of the displayed variable, and transmitting operator initiated messages over the communications network by way of the master node to the slave nodes for de-energizing the selected subsystems.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Figure 1:
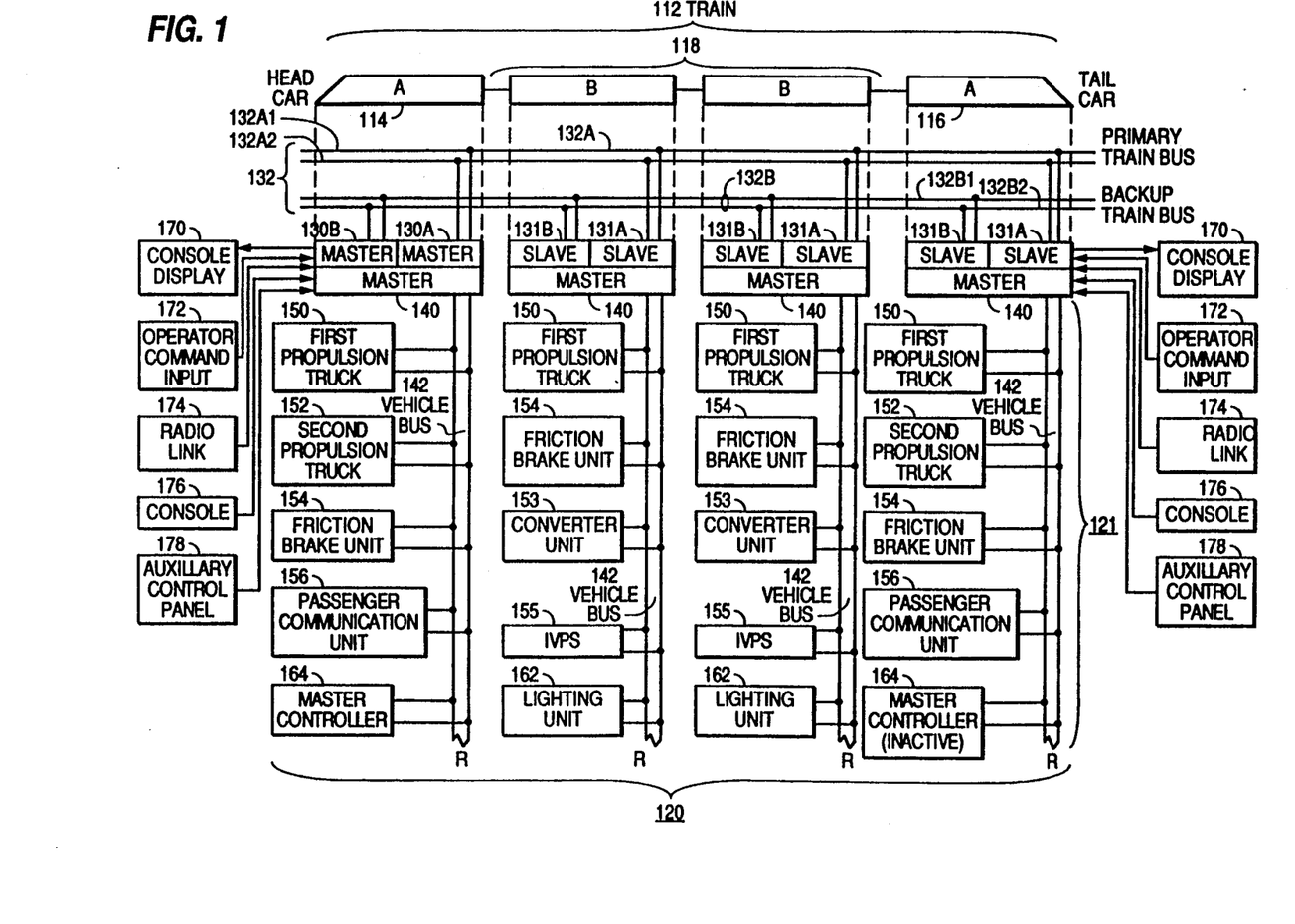
FIG. 1 is a schematic representation of a train and its associated trainline monitor (TLM) system in which the present invention has particular usefulness.

Referring now to FIG. 1, shown is a Trainline Monitor (TLM) System 120 in which the invention finds particular use. FIG. 1 shows a representative train 112 with a head car 114, a tail car 116, and middle cars 118. Only two middle cars 118 are shown, however a typical commuter train may have from one to ten middle cars 118 having essentially the same equipment on board.

Head car 114 has redundant train bus masters including primary train bus master 130A and backup train bus master 130B as shown. Primary train bus master 130A serves as a master node for primary train bus 132A and backup train bus master 130B serves as a master node for backup train bus 132B. Primary train bus 132A and backup train bus 132B make up redundant train buses 132. In addition, middle cars 118 and tail car 116 each have redundant train bus slaves including primary train bus slave 131A and backup train bus slave 131B.

Primary train bus 132A has a main channel 132A1 and an auxiliary channel 132A2. Similarly, back-up train bus 132B has a main channel 132B1 and an auxiliary channel 132B2. Unless otherwise indicated, communications on primary train bus 132A take place on main channel 132A1 and communications on back-up train bus 132B take place on main channel 132B1. Communications on auxiliary channels 132A2 and 132B2 only occur when primary train bus slave 132A and back-up train bus slave 132B "conclude" that they are on a tail car 116 as discussed for example in concurrently filed and commonly owned U.S. Pat. Application No. 07/853,796 entitled "A Method and Apparatus For Christening A Trainline Monitor System."

Each car 114, 116 and 118 has a vehicle bus master 140 with a vehicle bus 142. As used herein, trainline monitor system (TLM) 120 is intended to comprehend redundant train bus masters 130, redundant train bus slaves 131, redundant train buses 132, vehicle masters 140, vehicle buses 142 and intelligent subsystem interfaces (not separately shown) to vehicle buses 142 discussed below.

Examples of subsystems which may be found on head car 114 include first propulsion truck 150, second propulsion truck 152, friction brake unit 154 and passenger communication unit 156 as shown. Other subsystems, not shown for ease of illustration, may include a door control unit, a heating, ventilation and air conditioning unit (HVAC), a lighting unit, etc. Status information about the vehicle subsystems is requested, furnished and displayed according to the present invention.

Middle cars 118 can have the same subsystems as head car 114 but they typically would not have a second propulsion truck 152 or master controller 164 but instead would have a converter unit 153 and an intermediate voltage power supply (IVPS) 155. Tail car 116 has the same subsystems as head car 114 but with an inactive master controller 164. The following discussion regarding primary train bus master 130A applies to back-up train bus master 130B as well.

Head car 114 has, in addition to redundant train bus masters 130A and 130B, a console display 170, operator command input unit 172, radio link unit 174, console 176 and auxiliary control panel 178, which facilitate control and communications by a train operator.

Vehicle bus master 140 with redundant train bus masters 130A, 130B or redundant train bus slaves 131A, 131B can be embodied in three separate CPUs or a single CPU with a multitasking operating system and 3 separate I/O ports. Each of the train buses 132A and 132B, with its master and slave devices, are preferably configured as an HDLC packet communications network.

Referring to head car 114, vehicle bus master 140 communicates with one of redundant train bus masters 130A and 130B which in turn communicate with the rest of TLM system 120 via one of the primary train bus 132A and backup train bus 132B, respectively. Vehicle bus 142 has predetermined nodes and therefore does not have to deal with such considerations as geographic addressing or car orientation. Vehicle bus 142 can be, for example, an Intel BITBUS in which case the subsystems would have BITBUS interfaces. BITBUS is a master-slave communication system that uses a multi-drop RS-485 serial link. This provides a simple, expandable system to which all systems on the vehicle can easily interface. The subject matter of the well known industry standard Intel BITBUS is hereby incorporated by reference. BITBUS messages are transmitted as synchronous data link control (SDLC) data packets. During operation, the SDLC-encoded messages and protocol ensure data integrity and provide a way to request data retransmission if necessary.

Vehicle bus master 140 and the various subsystems 150-156, etc., operate under standard master-slave communications protocols. Vehicle bus master 140, vehicle bus 142 and the various vehicle subsystems comprise a master-slave communication subsystem 121.

Communications on the TLM system will be described below, in particular, communications which provide information to an operator of the master vehicle processing system 101 about particular subsystems 150-156 on one or more representative vehicles 118 of the train 112 over the TLM communications network, as described with reference to FIG. 1

Each car 114, 116 and 118 has a vehicle bus master 140 with a vehicle bus 142. As used herein, trainline monitor system (TLM) 120 is intended to comprehend redundant train bus masters 130, redundant train bus slaves 131, redundant train buses 132, vehicle masters 140, vehicle buses 142 and intelligent subsystem interfaces (not separately shown) to vehicle buses 142 discussed below.

TLM system 120 is connected to first and second propulsion trucks 150 and 152 by vehicle bus 142. The TLM system 120 can transmit test commands, propulsion commands, real-time clock synchronization information, etc., to the first and second propulsion trucks 150 and 152. First and second propulsion trucks 150 and 152 respond by transmitting back test results and status information over the TLM system 120.

In a like manner, TLM system 120 is connected to converter unit 153 by vehicle bus 142. TLM system 120 can transmit test commands and converter control commands such as converter on/off, load shedding commands and real-time clock synchronization information, etc., to converter unit 153. Converter unit 153 responds by transmitting back test results and status information to TLM system 120.

TLM system 120 is connected to a friction brake unit 154 by vehicle bus 142. TLM system 120 transmits test commands, braking commands and real-time clock synchronization information, etc., to friction brake unit 154. Friction brake unit 154 responds by transmitting back test results and status information to TLM system 120.

TLM system 120 is also connected to an intermediate voltage power supply (IVPS) 155 and passenger communication unit 156 by vehicle bus 142. IVPS converts 600 volt power into 350 volts which is necessary since some of the subsystems, such as friction brake unit 154, use 350 volt power. TLM system 120 transmits test commands, IVPS control commands, such as IVPS on/off commands, and real-time clock synchronization information, etc., to IVPS 155 and IVPS 155 responds by transmitting back test results and status information to TLM system 120. TLM system 120 transmits test commands, real-time clock synchronization information, car serial number, relative car position, car orientation information, zero speed commands, door open and close commands, and odometer or speed signals, etc., to passenger communication unit 156. Passenger communication unit 156 responds by transmitting back test results and status information to TLM system 120.

TLM system 120 is also connected to other subsystems such as a door control unit (not shown), a heating, ventilation and air conditioning (HVAC) unit (not shown), and a lighting unit 162, by vehicle bus 142. TLM system 120 transmits test commands, status requests, real-time clock synchronization information, car orientation information, etc., to the units. The units respond by transmitting back test results and status information.

Operator command input unit 172 of head car 114 may be a waterproof piezo keyboard having piezo keys integrated into a 5 mm aluminum plate and operated through a 0.8 mm aluminum cover plate. Console display 170 may be an electro-luminescent self-illuminated screen. Console 176 is a state driven device having a "power-up" state and a "operating" state.

If car 114 in train 112 is keyed-up, then operator console 176 is enabled and this car becomes the head car with redundant train bus masters 130A, 130B. At start-up, console display 170 displays results of power-up self-test. Then, TLM system 120 enters an "operating state." Console display 170 then displays a simple status message (OK, Warning, Failed or Non-existent) for each subsystem 150-164 on each car of train 112. The operator can use operator command input 172 to access diagnostic information on any of the subsystems 121 on any of the cars of train 112.

Information can also be transmitted or received by a wayside station using radio link 174 thereby reporting diagnostic alarms and acting as a diagnostic data dump at a specific point along the wayside.

In TLM 120 system shown in FIG. 1 in which the invention has particular usefulness, redundant train buses 132 are based on the DIN 43322 specification developed especially for the railroad environment, the subject matter of which is hereby incorporated by reference. It is configured as a master-slave communication system that uses a multi-drop RS-485 serial link. The serial data is Manchester encoded for higher reliability. This also allows it to pass through the galvanic isolation between cars. Train bus messages between vehicles are encoded into standard high level data link control (HDLC) data packets. During operation, the HDLC-encoded messages and protocol ensure data integrity and provide a way to request data retransmission if necessary.

Figure 2A:
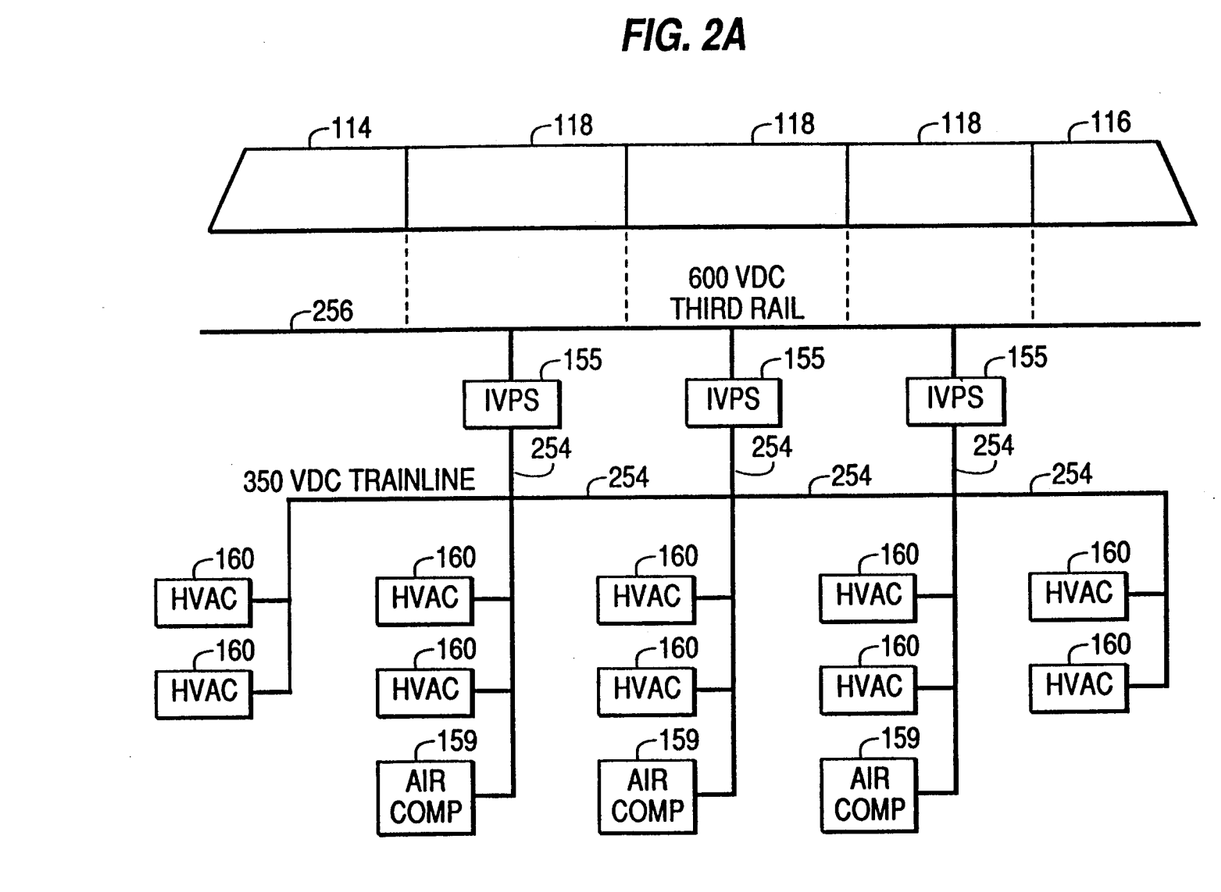
FIGS. 2A and 2B are schematic representations of intermediate voltage power supplies (IVPS's) and converter units on the middle cars of the train.

Referring to FIGS. 2A and 1, IVPS 155 is used to convert 600 V to 350 V. This 350 V is used to power equipment in train 112 such as air compressors 159 for pneumatic brake units 152, fans and compressors (not shown) for HVAC units 160, and cooling fans for propulsion trucks 150, 152. Here, IVPS's 155 are located in middle cars 118 in train 112, and their outputs all connect to a 350 V trainline or intermediate voltage output line 254 which runs through all cars in the train. Loads on intermediate voltage output line 254 are located in all cars of train 112. Normally, each IVPS 155 has an equal share of the load which here, e.g., is ⅓ of the total load. In this case, if one IVPS 155 is inoperative, the remaining two IVPS's 155 have ½ of the load, which is an increase in load of 50%.

Figure 2B:
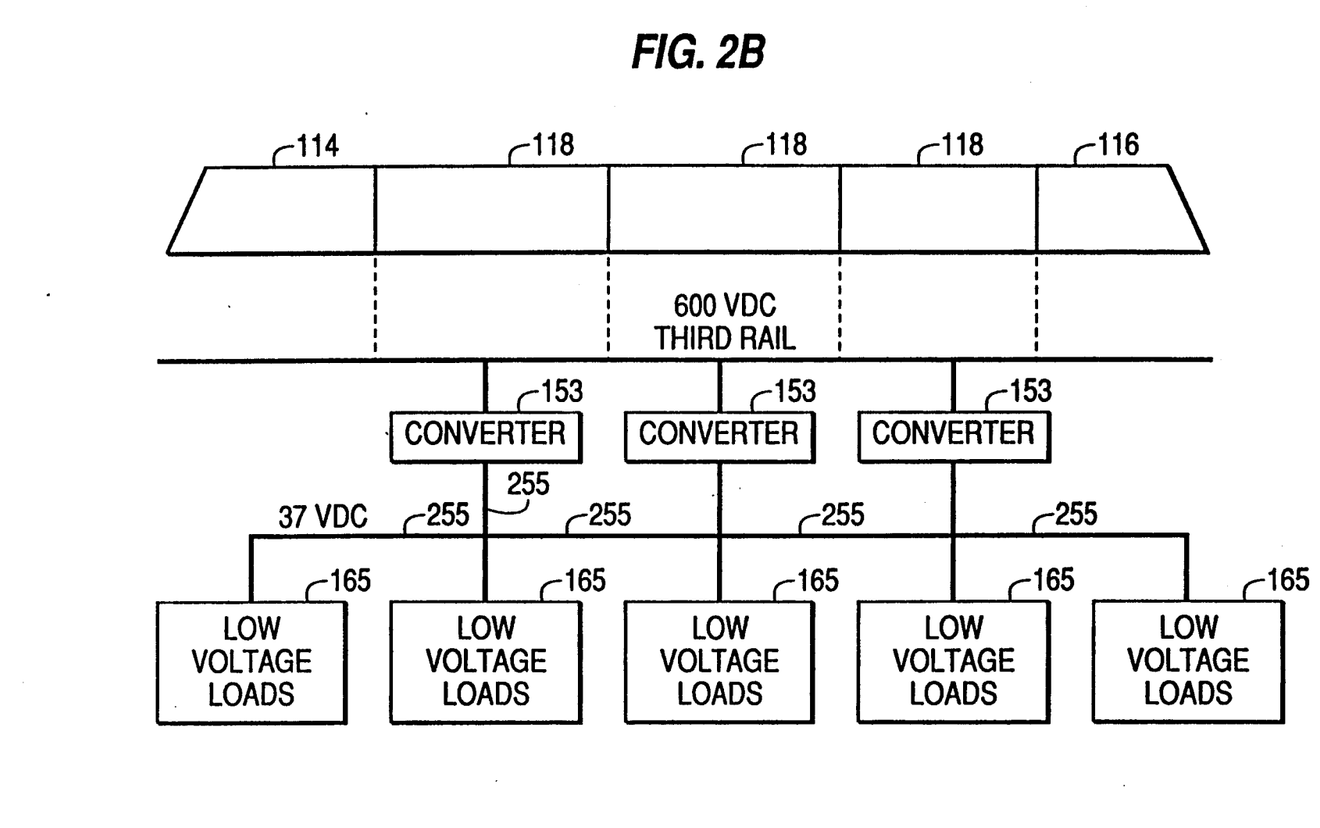

Referring to FIG. 2B, converter units 153 convert the 600 V from high voltage output line 256 into 37 V trainline or low voltage output line 255 which can be used to charge batteries (not shown) and to supply power to low voltage loads 165 on cars 118 in train 112, such as control electronics, lighting, destination signs, public address (PA) systems, etc. Here converter units 153 are located only in middle cars 118 in train 112, and their outputs are all tied to 37 V trainline 255 which runs the length of train 112. Again, when all converter units 153 are operational, each supplies ⅓ of the total load, but in the case of a failure, the two remaining converter units 153 now have to supply ½ of the total load, an increase in load of 50%.

Figure 3A:
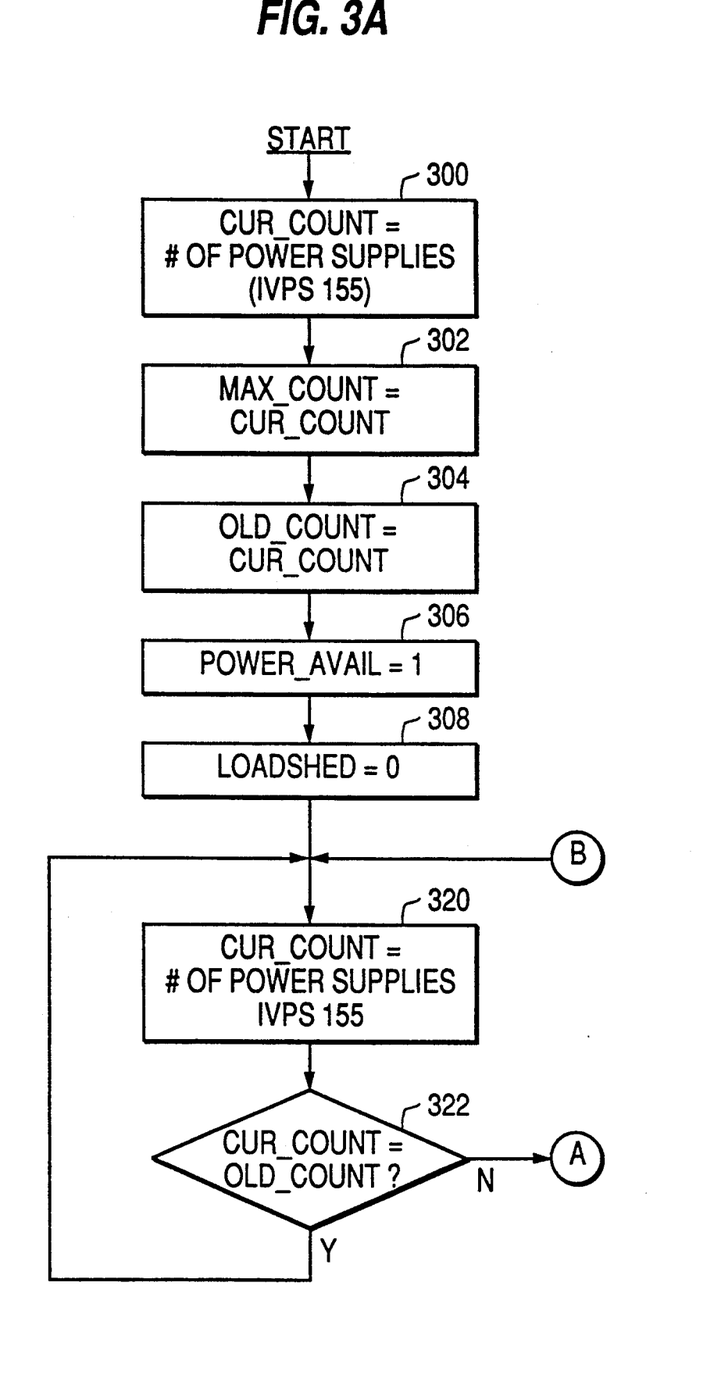
FIGS. 3A and 3B are block diagrams of a method of load shedding using the TLM system for a train according to one embodiment of the invention.
Figure 3B:
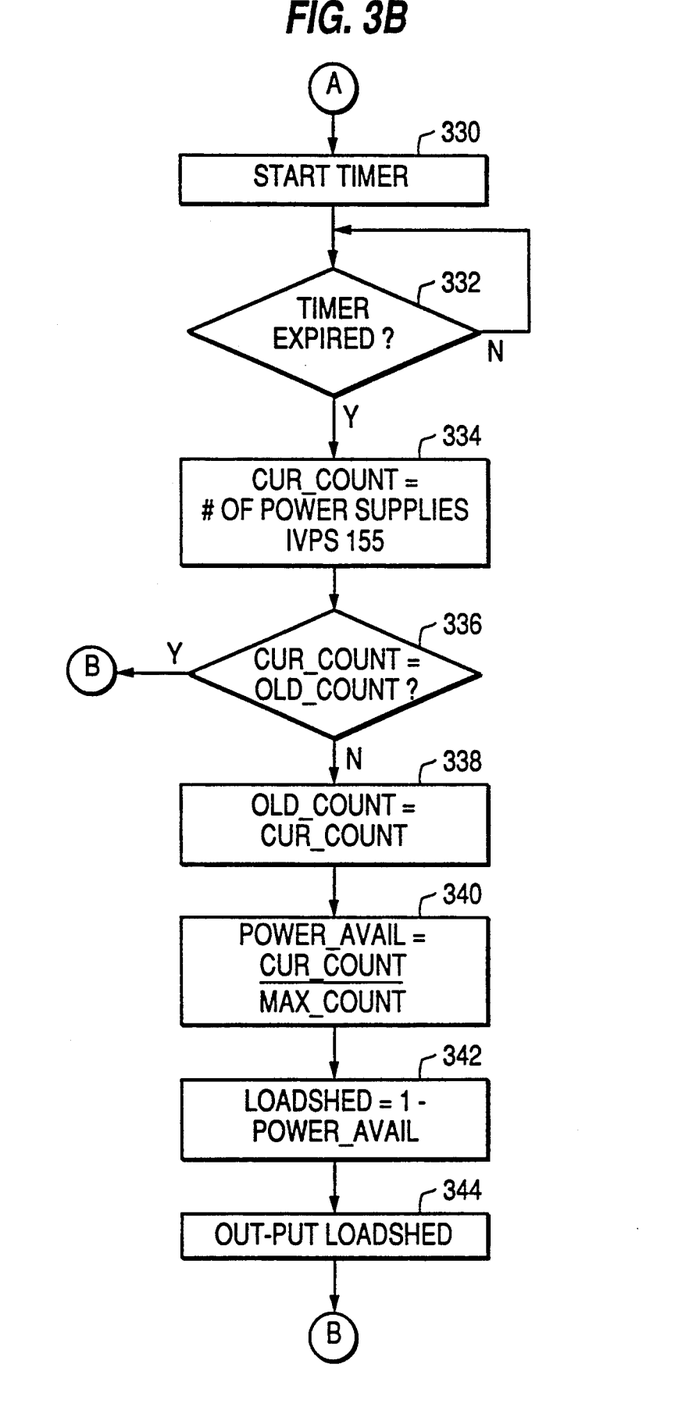

FIGS. 3A and 3B show the steps primary train bus master 130A of TLM system 120 follows in order to determine a load shed value which represents the fraction of power no longer available to equipment on train 112, i.e., the amount of load which must be shed. This load shed value in turn is used to determine which equipment should be shut down and/or reduce power consumption. In step 300, a variable called "cur_count," which represents the number of currently active power supplies (here IVPS's 155) on a particular line (e.g., intermediate voltage output line 254) on train 112 is initially set equal to the total number IVPS's 155 on train 112. Step 302 involves setting "max_count" (the total number of power supplies on line 254) equal to "cur_count." In step 304, a variable "old_count," which represents the number of IVPS's 55 which were active in a previous cycle, is initialized by setting it equal to the value of "cur_count." In step 306, "power_avail," which represents the ratio of IVPS's 155 not being used versus the total number of IVPS's - 155 ("max_count") on train 112, (i.e., power available) is initialized to 1. In step 308, "load_shed" which represents the ratio of non-functioning IVPS's 155 versus the total number of IVPS's 155 on train 112 (i.e., power to be shed) is initialized to 0. Hence, the sum of "power_avail" and "load_shed" is always unity.

In step 320, "cur_count" is updated to equal the number of active IVPS's 155 on train 112. Then, the value of "cur_count" is compared to "old-count" at step 322, and if they are the same (i.e., no IVPS's 155 have failed), step 320 is repeated and the comparison of step 322 is made again. Steps 320 and 322 are repeated until a mismatch occurs and "cur_count" no longer equals "old_count." Upon detection of a mismatch at step 322, primary train bus master 130A of TLM system 120 starts a timer at step 330 of FIG. 3B. TLM system 120 waits until timer of step 330 at step 332 indicates that a predetermined amount of time has expired (e.g., 5 minutes to 15 minutes). This insures that the mismatch at 320 was not a spurious effect but instead really indicates that one or more IVPS's 155 are not functioning. After the predetermined amount of time has expired (e.g. 15 minutes), "cur_count" is set equal to the number of active IVPS's 155 on train 112 at step 334 and at step 336, "cur_count" is again compared to "old_count." If their values are equal, no IVPS's 155 have failed and TLM system 120 repeats steps 320 and 322 of FIG. 3A, i.e., continues normal monitoring of IVPS's 155. On the other hand, if after the 15 minute wait "cur_count" is still not equal to "old_count," the mismatch is likely due to failure of one or more IVPS's 155 and consequently "old_count" is updated to the value of "cur_count" at step 338. At step 340, "power_avail" is updated to the value of "cur_count" divided by the value of "max_count" thereby indicating what fraction of total power is available, i.e., what fraction of the total number of IVPS's 155 are currently active. At step 342, "load_shed" is updated to 1- "power_avail" thereby indicating what fraction of total available power from all of IVPS's 155 has been lost, i.e., what fraction of IVPS's 155 are not active or functional. Finally, step 344 involves outputting the value of "load_shed" to console display 170 at head car 114 for viewing by the train operator who accordingly shuts down equipment on train 112. The process then returns to steps 320 and 322 of FIG. 3A.

Alternatively, since the value of "load_shed" determined at step 342 is proportional to the amount of power which must be shed by equipment on all cars of train 112, TLM system 120 can automatically de-energize or energize selective equipment based on the value of "load_shed." Namely, primary train bus master 130A can send an HDLC packet containing the value of "load_shed" to all of primary train bus slaves 131A which, accordingly shutdown equipment such as lights and/or change the temperature settings of the heaters and conditioning units so that they require less power to run and/or reduce power to air compressors (not shown) of friction brake units 154 by changing a trigger pressure points below which the compressor turns on. HVAC 160 can be put into a ventilation only mode so the air conditioning compressor pumps can be shut down and only its fans operate.

Finally, the power consumption of equipment on cars of train 112 can even be directly controlled by primary train bus master 130A after it determines the value of "load_shed." Namely, primary train bus master 130A can send an HDLC packet to primary train bus slave 131A via primary bus 1512A containing shut down commands indicating which equipment should be shutdown and/or which equipment should operate at lower power requirements.

The invention has been described in detail with respect to preferred embodiments, and it will now be apparent from the foregoing to those skilled in the art that changes and modifications may be made without departing from the invention in its broader aspects, and it is the intention, therefor, in the appended claims to cover all such changes and modifications as fall within the true spirit of the invention.

What is claimed is:

1. A method for controlling power consumed by a plurality of subsystems on a multi-car train having a plurality of power supplies connected in parallel for supplying power to the subsystems and a train wide communication network including a vehicle bus in each car of the train communicating with the power supplies and subsystems on the car, a train bus extending through the entire train, and communication nodes in each car interconnecting the train bus with each one of the vehicle buses, with one of the communication nodes in one of the cars constituting a master node and the other communication nodes in the other cars constituting slave nodes, each slave node communicating status information about power supplies and subsystems on its vehicle bus to the master node and communicating control information to the power supplies and subsystems on its vehicle bus, said method comprising:

using the communications network to periodically ascertain how many of the power supplies connected in parallel are operating;

determining, based on how many power supplies are operating and therefore available for supplying power at any given time, a first variable correpsonding to total power available for power consuming sybsystems on the train; and selectively reducing power consumption of subsystems on the train by way of the communications network in accordance with the first variable determined by said step of determining.

2. The method according to claim 1, wherein said step of selectively reducing power consumption includes:

making a selection at the master node of the subsystems on the train to be de-energized in dependence on the first variable of said step of determining, and sending messages from the master node to the slave nodes for de-energizing the selected subsystems in respective ones of the cars.

3. The method according to claim 1, wherein said step of selectively reducing power consumption includes:

sending the first variable determined by said step of determining to each one of the slave nodes, and causing each one of the slave nodes select subsystems on a respective one of the cars to be de-energized in dependence on the first variable.

4. The method according to claim 1, and further comprising the steps of:

displaying the first variable determined by said step of determining on an operator's display console, alerting the operator that the train is in a reduced power consumption mode, receiving as input from the operator selections of subsystems on respective ones of the cars to have reduced power consumption, and transmitting messages over the communications network by way of the master node to the slave nodes for de-energizing the selected subsystems based on the selections input by the operator.

5. The method according to claim 1, wherein said step of determining further includes determining a second variable representing one minus the first variable to indicate a proportion of total load that must be reduced.

* * * * *